(No Model.) 2 Sheets—Sheet 1.
LA VERNE W. NOYES & T. O. PERRY.
HARVESTER REEL.
No. 323,592. Patented Aug. 4, 1885.
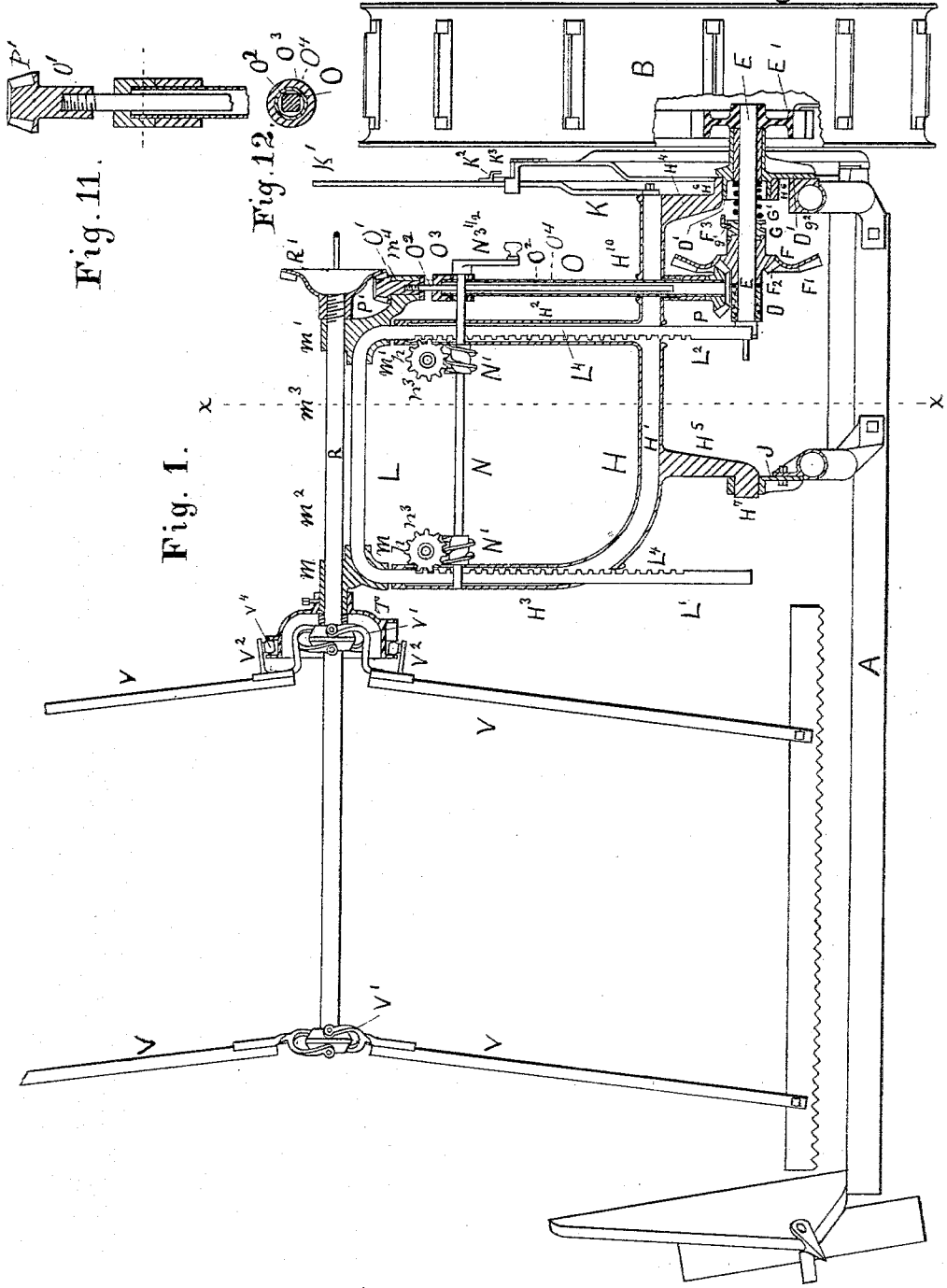
Witnesses:
Francis W. Parker
Inventors:
La Verne W. Noyes
Thos. O. Perry
By Chas. S. Burton
their Atty.

(No Model.) 2 Sheets—Sheet 2.
LA VERNE W. NOYES & T. O. PERRY.
HARVESTER REEL.
No. 323,592. Patented Aug. 4, 1885.
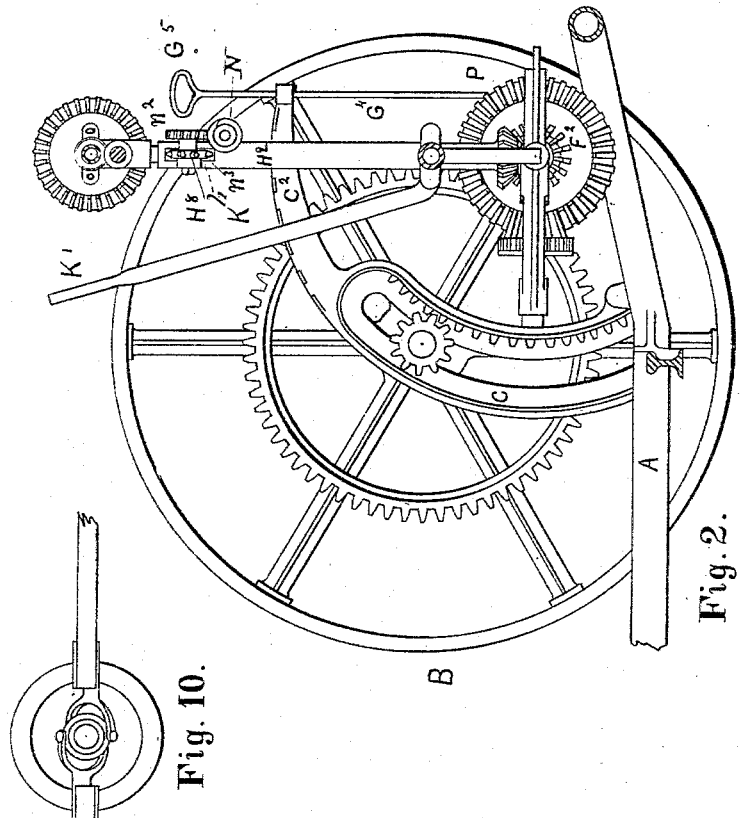
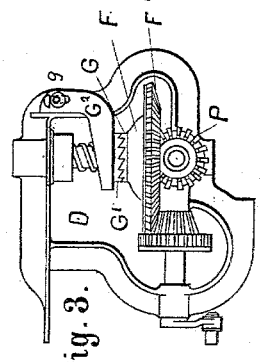
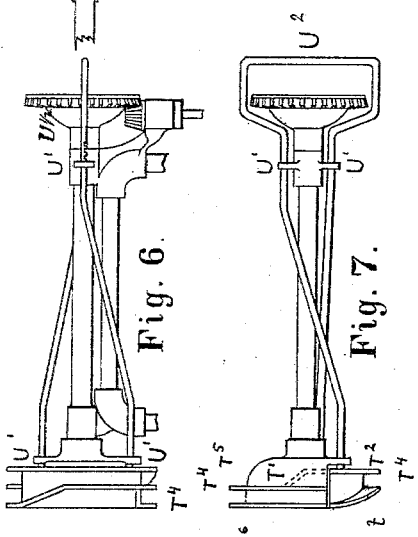
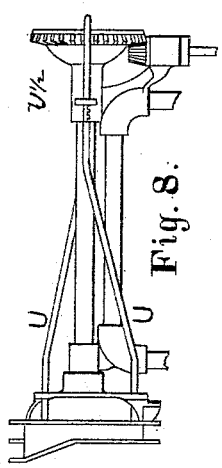
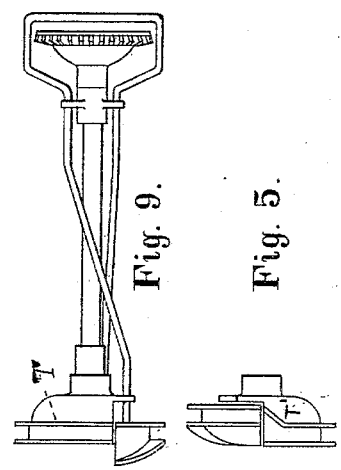
Witnesses:
Francis W. Parker
L. E. Riggs
Inventors:
La Verne W. Noyes
Thos. O. Perry
By Chas. E. Burton their Atty.

UNITED STATES PATENT OFFICE.

LA VERNE W. NOYES AND THOMAS O. PERRY, OF CHICAGO, ILLINOIS, ASSIGNORS TO WILLIAM DEERING, OF SAME PLACE.

HARVESTER-REEL.

SPECIFICATION forming part of Letters Patent No. 323,592, dated August 4, 1885.

Application filed November 10, 1884. (No model.)

*To all whom it may concern:*

Be it known that we, LA VERNE W. NOYES and THOMAS O. PERRY, citizens of the United States, and residing at Chicago, in the county of Cook and State of Illinois, have invented certain new and useful Improvements in Harvester-Reels, which are fully described in the annexed and following specification.

The purpose of this invention is to provide a reel for harvesting machinery whose actuation and adjustment shall be simpler and more complete than those now in use, in that it shall be driven by a gear on a shaft which derives its motion from the main driving-shaft, and so, without belt or chain or complex train of gearing, to communicate the motion; and in that it shall be supported in a rocking frame the axis of whose rocking motion shall be that of the main driving-shaft, so that no disturbance or necessity of adjustment of the driving connection shall be caused by changing the position of the reel.

It consists, further, in providing mechanism in connection with and to drive the reel, whereby the bats may at will be adjusted so as to receive an endwise movement while in contact with the standing grain for the purpose of causing it to fall in proper position on the platform, notwithstanding it may be lodged in one direction or the other, or be blown by the wind while falling.

It consists, also, in details of construction fully described and illustrated, and set forth in the claims.

Figure 1 is a partially sectional elevation of our reel and reel-frame and its adjusting and driving connections. Fig. 2 is a vertical sectional elevation of the same, made at the line $x\ x$ in Fig. 1. Fig. 3 is a plan view of the reel-driving gear and its connection with the main driving pinion and shaft. Fig. 4 is a detail view showing the clutch feathered onto the main driving-shaft. Fig. 5 is a front elevation of the cam-wheel by which the endwise movement of the bats is effected. Fig. 6 is a plan, and Fig. 7 is an elevation, of the reel-shaft, bearings, and adjusting-cam in a position to give the bats an endwise movement. Fig. 8 is a plan, and Fig. 9 is an elevation, of the same parts, showing the cam in a position to give the bats no endwise movement. Fig. 10 is a detail of the grain end of the reel, showing the connection of the reel-arms with the shaft at that end. Figs. 11 and 12 are, respectively, vertical and horizontal sections of the reel-driving shaft, showing the connection of the two telescoping parts.

A is a portion of the main frame. B is the main driving-wheel. C is the inner segment secured to the main frame. D is a bracket on the main frame, which affords bearing for the main driving-shaft. E is the main driving-shaft, on which E' is the main driving-pinion. F is a bevel gear-wheel having two banks of teeth, F' and F$^2$, the former to drive the cutting and binding mechanism and the latter to drive the reel, as hereinafter explained. The cutting and binding mechanisms, being no part of this invention, are not here shown. The hub of the gear F is elongated to form the sleeve F$^3$, having at its inner end the clutch G, mated by the clutch-collar G', which slides on and revolves with the shaft E, any of the customary means of effecting such connection being employed. The claw G$^2$, having slide-bearings on the bracket D, and actuated by the eccentric cam on the vertical shaft G$^4$, which is journaled in the bracket at $g$ and carried up to and journaled on the extension C' of the segment C, and provided with a handle, G$^5$, within reach of the driver, may serve to shift the collar-clutch G', with which it engages, as illustrated, its finger $g'$ lying in the annular peripheral groove $g^2$ of the collar.

H is the primary reel-frame, comprising the horizontal section H' and the two upright sections H$^2$ and H$^3$, all preferably tubular. The horizontal branch or section H' is fitted with two castings, H$^4$ and H$^5$, the former, H$^4$, terminating below in a short sleeve, H$^6$, encircling and bearing upon the annular flange D' of the bracket D, concentric with the shaft E, the latter, H$^5$, terminating in the horizontal gudgeon H$^7$, having a bearing, as illustrated on the upper end of the bracket J.

To the casting H$^4$, on the side toward the segment, we attach the lever K, which is securely bolted thereto, and extends thence upward, and is provided at its upper end with the handle K', by which the driver may rock the reel-frame about its axis—the main driving-shaft. That axis being also the center of curvature of the segment, we find it convenient to provide, as the means of securing the reel in any desired position in the arc through which it is rocked, as described, an extension of the outer rim of the segment in the form of the notched segment $C^2$, alongside of which the lever K swings, and to which it is locked in any desired position by means of any convenient form of catch. As illustrated in the drawings, the structure is that the arm K is provided with a laterally-projecting stud, $K^2$, to engage the notches of the segment $C^2$, being retained in position by the rigidity of the arm K, and adapted to be disengaged by pushing said lever-arm sidewise, the said arm having sufficient elasticity to permit such movement and to return it to its proper position of engagement when released from the pressure of the hand. To prevent the lever-arm being permanently bent by being pushed too far, we provide the hook $K^3$, jutting out from the arm P K over the segment $C^2$, and thence bent down on the opposite side a sufficient distance to form a stop for the sidewise motion of the arm K.

The mechanism above described enables the operator to effect an adjustment of the reel-frame back and forth.

For the purpose of vertical adjustment, we provide a secondary frame, L, in the form of an inverted letter U, having its branches L' and $L^2$ of such diameter as to slide within the tubular branches $H^2$ and $H^3$ of the primary frame H. At the upper angles or corner curves of the secondary frame we fit it with the castings $m$ and $m'$, having the horizontal bearings $m^2$ and $m^3$ for the reel-shaft.

It will be seen that the parts thus far described constitute a reel-sustaining frame capable of being moved up and down from and toward the driving-shaft. As a means for effecting this adjustment we provide the shaft N, mounted in bearings on the primary frame transversely thereto, and on such shaft we fix fast two endless screws or worms, N' N', preferably both between the branches $H^2$ and $H^3$ of the primary frame H, and in that case we make the screws of opposite pitch.

Upon supporting-lugs $H^8$, extended from the branches $H^2$ and $H^3$ of the primary frame H, we mount the spur-wheels $n^2 n^2$, meshing with and driven by the worm-wheels N' N'. On the same shaft with each of these worm-wheels is a cog-wheel, $n^3$, which protrudes through the opening $h$ on the tubular branch on which such cog-wheel is mounted, and engages with a rack, $L^4$, on the side of the branch of the secondary frame sliding within the outer primary frame, as described.

At the outer or stubble end of the shaft N, we secure the crank-handle $N^{3\frac{1}{2}}$, for the purpose of rotating said shaft N and worms N' N', and thereby the worm-wheels $n^2 n^2$ and cog-wheels $n^3 n^3$, and by the engagement of the latter with the racks $L^4 L^4$ raising or lowering the secondary frame L, and so effecting vertical adjustment of the reel.

For driving the reel hung in the compound adjustable frame described, we provide mechanism as follows: The branch H' of the primary frame H has between the vertical branch $H^2$ and the driving-wheel the vertical bearing $H^{10}$ for the reel-driving shaft O. Below said bearing the said shaft O has pinned fast to it and is carried by the bevel-gear P, which meshes with and is driven by the bevel-gear $F^2$, carried by the main driving-shaft, as above described. The reel-shaft R, journaled in bearings in the secondary frame at $m$ and $m'$, is provided at its outer or stubble end with a bevel gear-wheel, R'. The casting $m'$, beside the horizontal bearing $m^3$ for the reel-shaft, has also a vertical bearing in the lug $m^4$ for the upper end of the upper section, O', of the reel-driving shaft, which shaft has fixed to it above the lug $m^4$ the bevel-pinion P', meshing with and driving the bevel-gear R', which is fixed on and carries the reel-shaft R. Below its bearing in the lug $m^4$, we make the shaft $O^2$ square, and upon the upper end of the lower tubular section, O', of the reel-driving shaft we fit the cap $O^3$, rigidly secured thereto, and having throughout its head the square opening $O^4$ for the square shaft $O^2$, so that the latter, being passed through the cap into the tubular section $O^2$, may be driven by it while capable of telescoping within it.

To the grain side of the bearing of the reel-shaft we secure rigidly one half, T', of the cam T, and the other half, $T^2$, is sustained in position by being secured to the ends of the sliding rods U U, which have the slide-bearings U' U' in the castings $m'$ and $m'$ on the secondary reel-frame, and extend one on each side of the horizontal section of said frame to the stubble end of the reel-shaft, outside of which they rigidly unite and are provided with a suitable handle in reach of the driver. As illustrated, these two rods are formed of one piece of iron rod bent into the proper shape to be connected to the cam at its two ends, the middle part, $U^2$, serving as the handle.

The reel-arms V terminate at their junction with the reel-shaft in the forks V', striding the reel-shaft and having the extremities of their branches respectively pivoted to the reel-shaft, or to a collar rigid with the shaft, in lines oblique to the axis of said shaft, so that each reel-arm is adapted to rock over its pivots on the reel-shaft in a direction oblique thereto.

Above the junction of the two branches of the fork V' a stud, $V^2$, juts out from each reel-arm at such point as to overhang the cam-disk T and project its end down into the groove $T^4$ of said cam. To prevent friction we provide the end of the stud $V^2$ with the stud-roll $V^4$, mounted in the usual manner. The reel-arms at the grain end of the reel are precisely similar in construction to the arms at the stubble end, except that they have not the sideward projecting stud $V^2$ and its roll. The reel-bats are secured to the outward extremities of the reel-arms in the usual manner, but with a slight laxity in the junction to permit the endwise motion of the bats, which is caused as hereinafter explained. To further facilitate the purpose for which the bats are given said endwise motion they are made with their edges serrated or toothed or serpentine, as illustrated.

The cam T performs its function by means of its peripheral groove $T^4$, bounded by the cam-flanges $T^5$ and $T^6$. The part of the cam-groove which pertains to the half-cam $T'$ is widened at one end, and the part which pertains to the half-cam $T^2$ is widened at the other end of the dividing diameter, the widening in each half-cam being confined to a short distance near the dividing diameter, the remainder of the groove in each being of uniform width and in a plane at right angles to the axis of the reel-shaft. By shifting the movable half-cam $T^2$, by sliding its bearing-rods in their bearings in the frame, the straight parts of the groove in the two halves may be set in the same plane, and when so set the said groove will guide the stud throughout its entire revolution in the same plane and at right angles to the axis of the shaft; but when the half-cam $T'$ is so set that the straight parts of the groove $T^4$ in the two halves are in different planes, each stud $V^2$ as it passes out from one-half of the groove $T^4$ into the other half and encounters the oblique part $t$ of the bounding-wall of the groove will be forced aside from the plane in which it has been moving into the plane of the straight part of the groove in the half-cam which it is entering, and in that movement will rock the reel arm to which it pertains on its pivots and give to the bat attached to it an endwise movement at that point in its revolution. The oblique portions of the cam-flanges are arranged so that one of them will engage the stud $V^2$ and give the described endwise movement to the bats at a point just before the standing grain engaged by said bats is forced against the sickle and cut off—that is, while the grain is most fully under control of the bat—so that the position into which it shall fall on the platform when cut can be most effectually influenced by the said endwise motion. The other oblique part will fall at a point directly opposite the first—viz., while the bat is above the shaft and entirely clear of the grain.

It will be observed that the endwise motion of the bats may, while engaging the grain, be caused in either direction, depending only upon the direction of the oblique part of the guiding-wall of the groove $T^4$, which is at that instant giving direction to the stud $V^2$; also, that, as illustrated in the drawings, the widening of the groove at the point of the junction of the two halves of the cam is effected wholly on one side—viz., on the grain side above and on the stubble side below—so that the bats will move endwise grainward at the lower part of their rotation, and will return to their first position by moving stubbleward at the upper part. In practice this movement is found to be the one particularly needed, the opposite motion being seldom required. The amount of motion endwise will be determined by the distance which the movable half-cam is set out of line with the fixed half. Figs. 8 and 9 show it set in perfect line, so that no endwise movement will result. Figs. 6 and 7 show it set to give the maximum endwise movement. To secure the half-cam fixed at any desired point, the sliding rods U, or one of them, may be provided with notches $U^{\frac{1}{2}}$, and one of the slide-bearings may have secured to it a proper detent to engage the notches. As illustrated, the detent is fixed and the notch is designed to be disengaged from the detent by the torsion of the rod.

The toothed or serrated edges of the bats enable them to engage the grain more perfectly than they otherwise would, and so with greater certainty effect the purpose of the endwise movement.

The axes of the pivots of the reel-arms to the reel-shaft are oblique to that shaft in such direction that the reel-arms, swinging on those pivots on the under side when engaging the grain, move obliquely from the grain to the stubble from front to rear. When, therefore, by the action of the cam T, rocking the reel-arms on their said pivots, the said arms receive an endwise movement toward the grain, they receive also a sidewise motion forward—the reverse of their rotary motion—so that the effect is to slacken their speed just before and at the instant that the grain is forced against the sickle. The contrary effect—hastening the speed—will be caused at the upper part of the revolution in passing the upper oblique portion of the cam T before the bats enter the standing grain. The effect at both points is therefore to retain the grain for a longer time under the action of the bats, so insuring more perfect delivery to the platform.

We claim—

1. In a harvesting machine, in combination with the main driving shaft and the frame on which the same is supported, a rocking reel-sustaining frame the axis of whose rocking motion is the axis of the main driving-shaft, means for rocking said reel-sustaining frame over its pivot on the main frame and for securing it fixed in any desired position in the arc through which it is rocked, the reel-shaft and the reel-driving shaft journaled on said reel-sustaining frame at right angles with each other, and the bevel-gears on the main driving-shaft and the reel-driving shaft and the reel-shaft, whereby power is transmitted from the main driving-shaft and to the reel-driving shaft and thence to the reel-shaft, substantially as set forth.

2. In a harvesting-machine, in combination with the main driving-shaft and the frame on which it is supported, the primary rocking reel-frame pivoted to the main frame or some fixed adjunct thereof, the axis of whose rocking motion is the axis of the main driving-shaft, the means for rocking said primary frame over its said pivot and for securing it fixed in any desired position in the arc through which it is so rocked, the secondary or reel-carrying frame, means for sliding said secondary frame upon said primary frame and for securing it thereon at any desired distance from the main driving-shaft, a telescoping reel-driving shaft journaled on both said frames, and the beveled gears on the said main driving-shaft, reel-driving shaft, and reel-shaft, whereby power is transmitted from the main driving-shaft to the reel-driving shaft and thence to the reel-shaft, substantially as set forth.

3. In a harvesting-machine, in combination with the main driving-shaft and the frame on which the same is sustained, a rocking reel-frame pivoted to the main frame or some fixed adjunct thereof, and having as the axis of its rocking motion the axis of the main driving-shaft, means for rocking said reel-frame over its said axis, and means for securing it fixed in any desired position in the arc through which it is rocked, the reel-shaft journaled in said reel-frame, and means for transmitting power from said main driving-shaft to said reel-shaft, all substantially as set forth.

4. In a harvesting-machine, in combination with the main driving-shaft and the frame in which said shaft is supported, a reel-frame pivoted to the main frame and rocking thereupon over the axial line of said main driving-shaft, the reel-shaft journaled in said reel-frame, means for transmitting power from the main driving-shaft to the reel-shaft, and the segment $C^2$, formed as integral with the segmental axial guide and being a continuation of the curve thereof, and the lever K, secured rigidly to said reel-frame and provided with a suitable adjunct to engage the notches of the notched segment $C^2$, substantially as set forth.

5. In a harvesting-machine, in combination, the primary rocking reel-frame having the parallel side branches provided with openings for the cog-pinions, the secondary or reel-carrying frame having parallel side branches constituting similar rack-arms and telescoping within the similar tubular branches of the primary frame, the transverse crank-shaft journaled on said tubular branches, the endless screws fixed on said shaft, the worm-wheels meshing with and actuated by the endless screws, respectively, the cog-pinions rigid with said spur-wheels, respectively, and working through the openings $h$ and engaging with the rack-arms of the secondary frame, the reel-shaft journaled in said secondary frame, and means for transmitting power to said reel-shaft, substantially as set forth.

6. The combination, substantially as hereinbefore set forth, of the reel-shaft and its bearings, the cam secured to said bearings and having the alternating direct and oblique portions, the reel-arms pivoted to the reel-shaft and engaged by the cam and actuated by its oblique portions back and forth in the direction of the length of the reel once in each revolution thereof, and guided in direct rotation by the direct portions of said cam in the intervals of the said reciprocating movement, and the bats secured to the reel-arms and receiving endwise reciprocation from said movement of the reel-arms, substantially as set forth.

7. The combination, substantially as hereinbefore set forth, of the reel-shaft and its bearings, the cam secured to said bearings, the reel-arms, each pivoted to the shaft on pivots oblique thereto and engaged and actuated by the cam in the direction of the length of the reel, and the bats secured to the reel-arms.

8. The combination, substantially as hereinbefore set forth, of the reel-shaft and its bearings, the divided cam secured to said bearings, means for adjusting the parts of said cam in different positions with reference to each other, as described, and the reel-bats secured to the reel-arms.

9. The combination, substantially as set forth, of the reel-shaft and its bearings, the cam secured to said bearings and having the alternating direct and oblique portions, the reel-arms pivoted to the reel-shaft and engaged by the cam and actuated by its oblique portions back and forth in the direction of the length of the reel once in each revolution thereof, and guided in direct rotation by the direct portions of said cam in the intervals of said reciprocatory movement, and the bats secured to the reel-arms and receiving endwise reciprocation therefrom and provided with toothed or serrated edges, substantially as set forth.

In testimony whereof we have hereunto set our hands, in the presence of two witnesses, at Chicago, Illinois, this 29th day of July, A. D. 1884.

LA VERNE W. NOYES.
THOMAS O. PERRY.

Attest:
I. K. WEST,
CHAS. S. BURTON.